United States Patent [19]
Lee et al.

[11] Patent Number: 5,854,617
[45] Date of Patent: Dec. 29, 1998

[54] CIRCUIT AND A METHOD FOR CONTROLLING A BACKLIGHT OF A LIQUID CRYSTAL DISPLAY IN A PORTABLE COMPUTER

[75] Inventors: Chang-Hum Lee, Anyang; Yun-Ho Choi, Seoul, both of Rep. of Korea

[73] Assignee: SamSung Electronics Co., Ltd., Suwon, Rep. of Korea

[21] Appl. No.: 647,064

[22] Filed: May 9, 1996

[30] Foreign Application Priority Data

May 12, 1995 [KR] Rep. of Korea ................. 1995/11722

[51] Int. Cl.$^6$ ........................................... G09G 3/36
[52] U.S. Cl. .......................... 345/102; 345/63; 345/211; 395/750.03; 395/750.08
[58] Field of Search ............................ 345/63, 102, 212, 345/211, 87, 77; 395/750.03, 750.06, 750.08

[56] References Cited

U.S. PATENT DOCUMENTS

| | | |
|---|---|---|
| 4,748,546 | 5/1988 | Ukrainsky . |
| 4,945,350 | 7/1990 | Kawamura ............. 345/102 |
| 4,975,692 | 12/1990 | Tateyama . |
| 5,030,943 | 7/1991 | Anglin . |
| 5,065,357 | 11/1991 | Shiraishi et al. . |
| 5,078,476 | 1/1992 | Shin . |
| 5,099,178 | 3/1992 | Bozzer et al. . |
| 5,130,907 | 7/1992 | Tortola et al. . |
| 5,144,292 | 9/1992 | Shiraishi et al. . |
| 5,184,117 | 2/1993 | Gauthier . |
| 5,225,822 | 7/1993 | Shiraishi et al. . |
| 5,247,286 | 9/1993 | Ishikawa . |
| 5,313,225 | 5/1994 | Miyadera . |
| 5,315,695 | 5/1994 | Saito et al. . |
| 5,384,577 | 1/1995 | Mclaughlin et al. . |
| 5,406,305 | 4/1995 | Shimomura et al. . |
| 5,440,324 | 8/1995 | Strickling III et al. . |
| 5,493,685 | 2/1996 | Zenda ................. 395/750.08 |

*Primary Examiner*—Richard A. Hjerpe
*Assistant Examiner*—Kent Chang
*Attorney, Agent, or Firm*—Robert E. Bushnell, Esq.

[57] ABSTRACT

A backlight luminescence control device for use in a portable computer to control a backlight of a liquid crystal display. When an AC adaptor is not connected to the portable computer, the device senses the voltage level of a DC battery and generates an electrical signal that indicates the status of the battery. From the voltage level of the DC battery, the device ascertains the appropriate luminescence level of a cold-cathode fluorescent backlight lamp (CCFL), automatically controls the brightness of the CCFL through several levels of luminosity, and optimizes the luminescence of the CCFL according to the voltage level available in the DC battery.

23 Claims, 4 Drawing Sheets

CIRCUIT AND A METHOD FOR CONTROLLING A BACKLIGHT OF A LIQUID CRYSTAL DISPLAY IN A PORTABLE COMPUTER

CROSS-REFERENCE TO RELATED APPLICATION

This application makes reference to, incorporates the same herein, and claims all benefits accruing under 35 U.S.C. §119 from an application for A Circuit And A Method For Controlling A Backlight Of A Liquid Crystal Display In A Portable Computer earlier filed in the Korean Industrial Property Office on 12 May 1995 and there duly assigned Ser. No. 11722/1995.

BACKGROUND OF THE INVENTION

1. Technical Field

The present invention relates to a backlight drive circuit for controlling a backlight of a liquid crystal display (LCD), and more particularly, to a method for driving a cold cathode fluorescent lamp (CCFL) for back lighting the liquid crystal display (LCD) of portable computers such as notebook and laptop computers.

2. Background Art

Generally, there are a number of display technologies available for portable personal computers. For example, cathode ray tube (CRT), gas plasma display, electroluminescent (EL) display and liquid crystal display (LCD) technologies are known. Early portable personal computers such as terminal and desk top computers were provided with cathode ray tube displays or electroluminescent displays for displaying information data. Both cathode ray tube displays and electroluminescent displays however require only commercially available alternating current (AC) power source for operation, and are thus unsuitable for portable personal computers that are intended for operation by alternative power source such as a battery. Gas plasma displays, on the other hand, are driven by both the commercially available alternating current (AC) power source and the battery. However, they consume relatively more power than other display technologies, and are therefore unsuitable for battery operated portable personal computers.

Liquid crystal display technology, by contrast, is most suitable for portable, hand held, battery-operated personal computers because the liquid crystal display can be constructed in a compact size and requires lesser power source. A typical liquid crystal display is formed from a liquid crystal sandwiched between two optical polarizing plates attached to adjacent glass panels. If there is no electric field across the liquid crystal, the molecules of the liquid crystal remain parallel to the glass panels and are twisted by an angle of, for example, 90 degrees from one glass panel to the other glass panel. In this condition, when a linearly polarized light through a first polarizing plate reaches a second polarizing plate, the polarization of the light is rotated by 90 degrees. Since the polarization axes of the polarizing plates are positioned in an angle of 90 degrees, the direction of the polarization of the light coincides with the polarization axis of the second polarizing plate and, thus, the light passes through the other polarizing plate.

When there is an electric field across the liquid crystal formed by application of a voltage to the polarizing plates, the molecules of the liquid crystal tend to align with the electric field. A linearly polarized light through a first polarizing plate reaches a second polarizing plate without rotation of the polarization. Since the polarization axes of the polarizing plates are positioned in an angle of 90 degrees, the direction of the polarization of the light is perpendicular to the polarization axis of the second polarizing plate and, thus, the light cannot pass through the second polarizing plate. The panels are divided into a multiplicity of pixels arranged in a matrix pattern to provide a display screen. Characters or images can be displayed by controlling the voltages applied to the pixels.

Liquid crystal display (LCD) is however a passive device that does not emit light. Therefore, such a liquid crystal display is usually dark and often indecipherable. Some known personal computers are provided with reflective type LCD. These reflective LCD displays do not produce light, but rather depend on ambient light. Consequently, in conditions of low ambient light, these reflective LCD displays provide low contrast and poor readability. In order to solve this problem, some LCD displays are now backlit to obviate the dependence of the display on ambient light. Some LCD displays such as disclosed, for example, in U.S. Pat. No. 5,384,577 for Combination Display Backlight And Light Sensor issued to McLaughlin et al., include both a reflective LCD for reflecting ambient light, and a backlight mechanism for providing light through the display to improve the readability of the information when the ambient light is below a threshold. Different types of light sources may be used as a backlight mechanism for producing the backlighting of the LCD display, such as high intensity incandescent light bulbs and high intensity cold-cathode fluorescent lights (CCFL). Cold-cathode fluorescent lamps are widely used as a backlight source for the LCD displays because they last longer, generate less heat and contain greater contrast ratio in comparison with the incandescent light bulbs.

In order to improve the portability of the personal computers, it is necessary to minimize the power consumption of a display and to thereby prolong the service life of a battery, when the commercially available alternating current power supply is not provided. Conventional LCD displays such as disclosed, for example, in U.S. Pat. No. 5,056,357 for Data Processing Machine With Liquid Crystal Display And Control Means For Regulating Backlighting To The Display issued to Shiraishi et al., U.S. Pat. No. 5,247,286 for Display Control Device For Reducing Power Consumption Of Display Units issued to Ishikawa, and U.S. Pat. No. 5,313,225 for Liquid Crystal Display Device issued to Miyadera, incorporate power saving features which seek to automatically turn off the backlight of a LCD after a predetermined period in which the information is displayed has lapsed or the LCD display is left inoperative.

More recent LCD displays such as U.S. Pat. No. 5,225,822 for Liquid Crystal Display System With Variable Backlighting For Data Processing Machine issued to Shiraishi et al., and U.S. Pat. No. 5,315,695 for Personal Computer Capable Of Altering Display Luminance Through Key Operation issued to Saito et al., even allow an operator to change the luminescent level of the backlight in accordance with the lighting conditions under which the portable computers are operated in order to prolong the service life of the battery. In Shiraishi et al. '822, for example, a LCD display incorporating electroluminescent backlighting is provided with several degrees of luminosity. In particular, a selection circuit specifies a degree of luminosity to allow the light source to generate a selected luminosity level for backlighting the LCD display. Similarly, in Saito et al. '695, a battery operated personal computer is constructed such that an operator can adjust the luminescent level of the backlight of a LCD display by way of a keyboard however regardless of whether the battery is in low battery status. While the automatic luminescence adjustment circuits of Shiraishi et al. '822 and Saito et al '695 are so designed to minimize the consumption of power and to increase the service life of the backlight source and battery, the luminescent level of the LCD display may still become either too low to discern the displayed information such as characters, images or a combination thereof, or too high so as to cause glare. This often reduces work efficiency, and leads to asthenopia and mental fatigue. Moreover, when the alternating current (AC) power source is not provided to the portable personal computer, the backlight of a LCD display continue to glow until the battery is discharged.

In U.S. Pat. No. 5,406,305 for Display Device, Shimomura et al., seek to optimize the luminescent level of a LCD display in accordance with ambient light to secure a satisfactory visibility acceptable to human eyes in order to avoid a glaring sensation. However, there is no provision in Shimomura et al. '305 of how the luminescent level of a LCD display can be optimized particularly when the battery is in use. A better solution is to optimize the power consumption of the backlight of a LCD display according to selective power supply from one of an alternating current (AC) power source and a battery as disclosed in U.S. patent application Ser. No. 08/550,493 for Backlight Circuit For A Liquid Crystal Display, earlier filed on Oct. 30, 1995 and assigned to the same assignee as the assignee of the present invention. In the backlight control circuit disclosed in U.S. application Ser. No. 08/550,493 which is incorporated by reference herein, when an AC adaptor providing alternating current power source is connected to the portable computer, the luminescent level of a LCD display remains the highest since the operation of the portable computer is not limited by its power supply. When the battery is in use, however, the brightness is optimized according to the power status of the battery. That is, steady luminescence is maintained regardless of an operator's need, and it is optimized regardless of whether battery power becomes lower than a certain threshold level. We have observed however, that the screen is always dimmer when using a battery than an AC adaptor even though the service life of the battery has been extended. Accordingly, we believe that improved means for controlling the backlight of a LCD display can be contemplated to maintain such a LCD display at an optimal luminescence level based on the power supply from one of an alternating current adapter and a battery in accordance with the operator's requirement.

SUMMARY OF THE INVENTION

It is therefore an object of the present invention to provide an improved backlight luminescence control apparatus for a liquid crystal display.

It is another object to provide an improved backlight luminescence control apparatus for controlling the backlight of a liquid crystal display at an optimal luminescence level based on selective power application from one of an alternating current adapter and a battery.

It is still another object to provide an improved backlight luminescence control apparatus for controlling the backlight of a liquid crystal display through several luminescence levels in accordance with an operator's requirement to obtain an optimal luminosity.

These and other objects can be achieved by a backlight luminescence control apparatus for a liquid crystal display constructed according to the principles of the present invention using an AC adaptor for transforming alternating current into direct current to drive the liquid crystal display; a battery sensing unit for sensing the voltage level of a battery and producing an electrical signal indicating the power status of the battery when an alternating current is not available for the backlight; a controller unit for determining whether the AC adaptor is connected to drive the liquid crystal display, measuring the voltage available in the battery if the AC adaptor is not connected, determining the luminescence level from the measured voltage, and producing a control signal corresponding to the luminescence level; and a back light driving unit for driving the backlight of the liquid crystal display according to the control signal.

A method practiced according to the principles of this invention may begin by establishing a luminescence level and initializing a timer if the system has inputted the appropriate automatic luminescence control command; determining whether an AC adaptor for transforming AC current into DC current is connected; measuring the voltage level of the battery if an AC adaptor is not connected; comparing the measured voltage level with the voltage required to maintain the established luminescence level; lowering the level of the established luminescence level by one level if the voltage level of the battery is lower than the voltage required to maintain the present luminescence level; and producing a luminescence control signal to the backlight corresponding to the lowered luminescence level.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
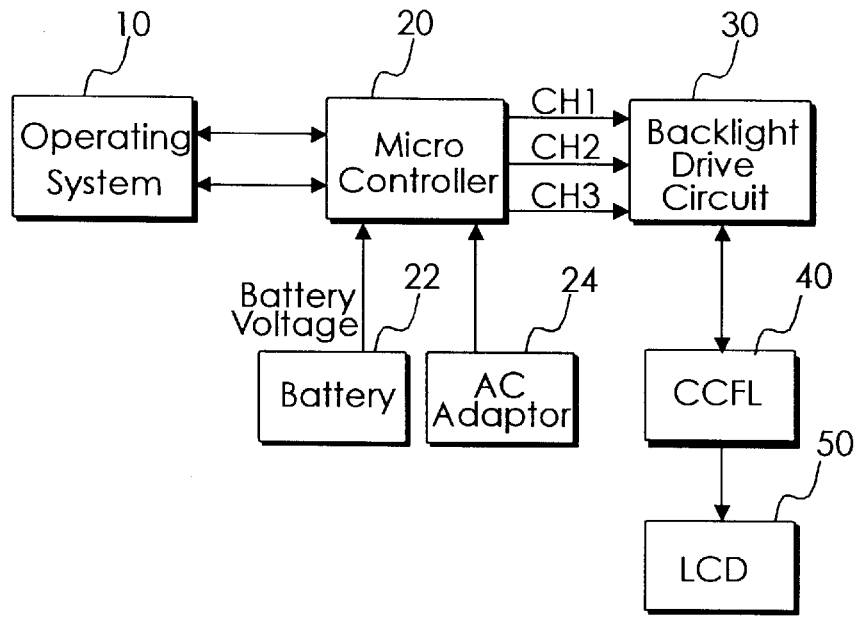
FIG. 1 illustrates an arrangement of a backlight luminescence control apparatus for use in a portable computer to control a backlight of a liquid crystal display according to the principles of the present invention.

Referring now to the drawings and particularly to FIG. 1, which illustrates an arrangement of a backlight luminescence control apparatus for use in, for example, a portable personal computer to control a backlight of a liquid crystal display (LCD) according to the principles of the present invention. In FIG. 1, a microcontroller 20 is connected to an operating system 10 of, for example, a portable computer and a backlight drive circuit 30 which electrically drives a LCD display 50. A cold-cathode fluorescent lamp 40 as a light irradiating unit is electrically driven by the backlight drive circuit 30 for backlighting the LCD display 50. The microcontroller 20 controls the luminescence of the backlight of the LCD display 50 based on selective power supply from one of an alternating current (AC) adapter 24 and a battery 22 in accordance with an operator's requirement. If battery 22 is in use, the microcontroller 20 measure the voltage level of the battery 22 and automatically optimizes the luminescence of the LCD display 50 through several levels of luminosity according the voltage level measured from the battery 22.

Figure 2:
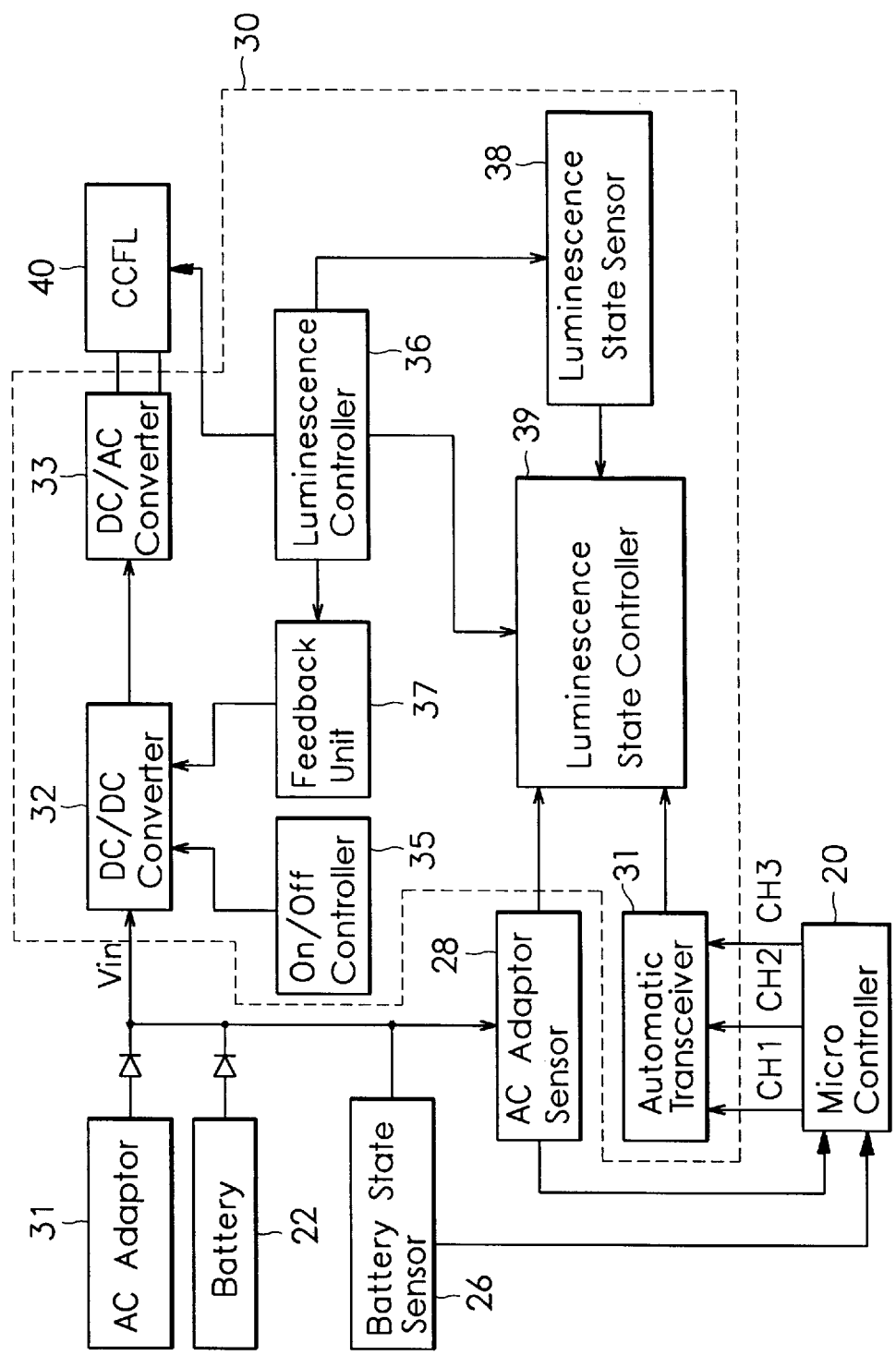
FIG. 2 illustrates a block diagram of a backlight luminescence control apparatus constructed according to the principles of the present invention.

FIG. 2 illustrates a construction of a backlight luminescence control apparatus according to a preferred embodiment of the present invention. A battery state sensor 26 is connected to the battery 22 of a portable computer for detecting the voltage level remaining in the battery 22 and generating a battery voltage signal corresponding to such a detection. The battery state sensor 40 is also electrically connected to the microcontroller 20 so that the microcontroller 20 is able to control the luminescence of the LCD display 50 through several levels of luminosity according the battery voltage level measured from the battery 22.

Similarly, an AC adaptor sensor 28 is coupled to an AC adaptor 24 and the battery 22 for detecting whether the AC adaptor 24 is in use, and generating an AC detection signal when the AC adaptor 24 is connected to the portable computer to convert commercially available alternating current (AC) received from an output receptacle into a direct current (DC). The AC adaptor sensor 28 is also electrically connected to the microcontroller 20 so that the microcontroller 20 is able to control the luminescence of the LCD display 50 through several levels of luminosity according the power supply from a commercially available alternating current (AC) source.

The microcontroller 20 receives one of the battery voltage signal from the battery state sensor 26 and the AC detection signal from the AC adaptor 24 in order to determine the appropriate luminescence level of the backlight and generate a corresponding luminescence control signal. A backlight drive circuit 30 is connected to the microcontroller 20 to drive the CCFL 40 with the appropriate luminescence level according to the luminescence control signal from the microcontroller 20.

As shown in FIG. 2, the backlight drive circuit 30 includes a direct current/direct current (DC/DC) converter 32 for producing switching signals when a DC current passes through a switching regulator. The DC/DC converter 32 is connected to the AC adaptor 24 and is regulated by an on/off controller 35 to drive the cold-cathode fluorescent lamp 40. A direct current/alternating current (DC/AC) converter 33 is connected to the DC/DC converter 32 for converting the switching signals output from the DC/DC converter 32 into an alternating current (AC) to drive the cold-cathode fluorescent lamp (CCFL) 40. The luminescence controller 36 generates luminescence output signals according to the physical states of the CCFL 40.

A feedback unit 37 is connected to an output terminal of the luminescence controller 36 and an input terminal of the DC/DC converter 32 to form a feedback loop so that the luminescence output signals from the luminescence controller 36 can be fed back to the DC/DC converter 32. Another output terminal of the luminescence controller 36 is connected to a luminescence state sensor 39 which determines the luminescence level of the CCFL 34 from the luminescence output signals from the luminescence controller 36.

An automatic transceiver 39, whose output signals indicate the status of a battery's power level when the battery 22 is in use, is connected to the microcontroller 20 through three output channels CH1, CH2 and CH3. The output terminal of the automatic transceiver 39 is connected to the luminescence state controller 39 which also receives the AD detection signal from the AC adaptor sensor 28 and a luminescence state signal output a luminescence state sensor 38 to determine and control the luminescence state of the backlight, i.e., the CCFL 40 of a LCD display 50.

Figure 3:
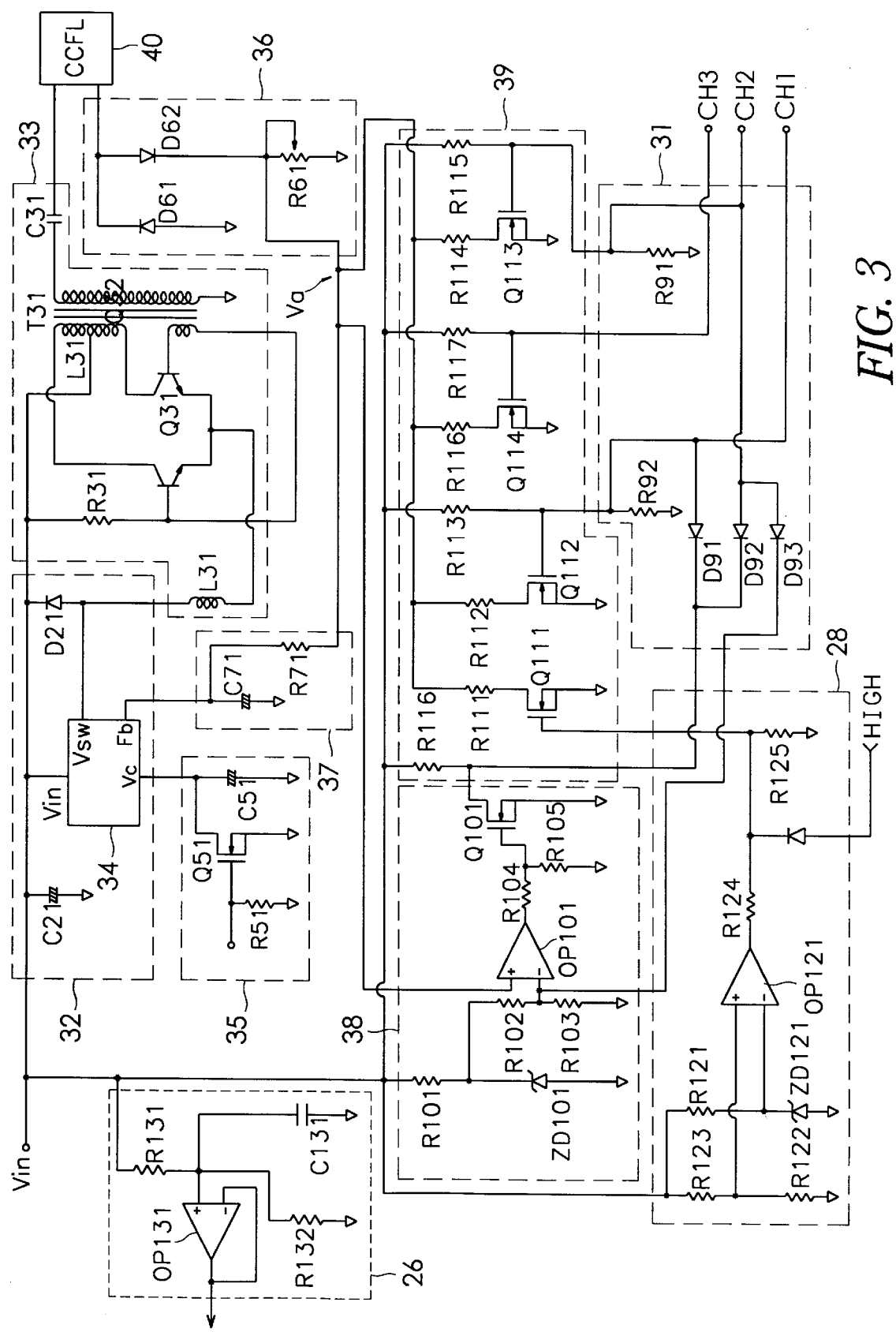
FIG. 3 illustrates a schematic diagram of a backlight drive circuit of the backlight luminescence control apparatus for driving the backlight of a liquid crystal display according to a preferred embodiment of the present invention

FIG. 3 illustrates a schematic diagram of a backlight drive circuit 30 of the backlight luminescence control apparatus for driving the backlight of a LCD display 50 according to a preferred embodiment of the present invention. As shown in FIG. 3, an AC adaptor sensor 28 is constructed with a pair of resistors R123 and R122 coupled in series between a battery voltage source Vin and a ground potential. A resistor R121 and a zener diode ZD121 are arranged in series but parallel to the resistors R123 and R122. A comparator OP121 whose positive input terminal is connected to the midpoint between resistors R123 and R122 and whose negative input terminal is connected midway between resistor R121 and zener diode ZD121. Resistors R124, R125 are connected in series between the output terminal of the comparator OP121 and the ground, and a diode D121 whose cathode terminal is connected midway between resistors R124 and R125 and whose anode terminal is connected to the microcontroller 20.

The DC/DC converter 32 includes a capacitor C21 connected between the DC source voltage Vin and a ground potential. A switching regulator 34 is constructed, for example, by a LT1172 chip, and a diode D21 whose cathode terminal is connected to the DC source Vin and whose anode terminal is connected to the output terminal Vsw of the switching regulator 34.

The DC/AC converter 33 includes a coil L31 connected to the output terminal Vsw of the switching regulator 21 of the DC/DC converter 32. A pair of transistors Q31 and Q32 whose emitters are connected to the coil L31. A transformer T31 has a center tap connected to the base terminal of transistor Q31 through a resistor R31, and an input terminal connected between the base terminals and collector terminals of transistors Q31 and Q32. A capacitor C31 is connected at one end to the output terminal of transformer T31 for regulating electric current flow to the CCFL backlight 40.

The on/off controller 35 is used to turn off the backlight provided by the CCFL 40. The on/off controller 35 includes a resistor R51 connected between the on/off signal line and a ground potential. A transistor Q51 whose base gate terminal is connected to resistor R51 and a capacitor C51, which is connected between the drain terminal of transistor Q51 and a ground potential.

The luminescence controller 36 includes an inverse diode D61 connected between the CCFL backlight 40 and a ground potential. A diode D62 has an anode terminal connected to the CCFL backlight 40. A variable resistor R61 (acting as the first current channel) is connected to an output terminal of diode D62 and a ground potential for forming a first current channel.

The feedback unit 37 includes a resistor R71 having one terminal connected to an output terminal of the luminescence controller 36, and a capacitor C71 connected between the other terminal of resistor R71 and a ground potential.

The luminescence sensor 38 includes a resistor R7 and a zener diode ZD101 connected between the DC source Vin and a ground potential in series. A pair of serially connected resistors R102 and R103 are connected parallel to the zener diode ZD101. A comparator OP101 has a positive terminal connected to the output terminal of the luminescence controller 36 while its negative terminal is connected midway between resistors R102 and R103. A pair of resistors R104 and R105 are connected in series between the output of the comparator OP101 and a ground potential, and a transistor Q101 connected midway between resistors R104 and R105.

The automatic transceiver 31 which coupled to receive the first, second and third channels CH1, CH2, CH3 from the microcontroller 20 includes a resistor R91 connected to a terminal receiving the second channel CH2 and a ground potential. A resistor R92 is connected to a terminal receiving the first channel CH1 and a ground potential. A diode D91 has an anode terminal coupled to receive the first channel CH1. A pair of diodes D92 and D93 are connected in parallel with their respective anode terminals connected to the second channel CH2. The third channel CH3 from the microcontroller 20 is input to the luminescence state controller 39.

The luminescence controller 39 has a current channel denoted as the first current channel which in turn is made up of a transistor Q111 whose gate terminal is connected to the output terminal of the AC adaptor sensor 28 and a resistor R11, a second current channel made up of a transistor Q112 whose gate terminal is connected to the output terminal of the automatic transceiver 31 and two resistors R112 and R113, a fourth current channel made up of a transistor whose gate terminal is connected to the output terminal of the automatic transceiver 39 and two resistors R114 and R115 and also as part of the fourth current channel, and a transistor Q114 whose gate terminal is connected to the output terminal of the automatic transceiver 39 and two resistors R116 and R117.

The battery state sensor 26 includes a pair of resistors R131 and R132 connected in series between the DC source Vin and a ground potential. A capacitor C131 is connected in parallel to the midpoint of the two resistors R131 and R132 and an amplifier OP131 whose positive terminal is connected midway between resistors R131 and R132 and whose negative terminal is connected to its output terminal.

Figure 4:
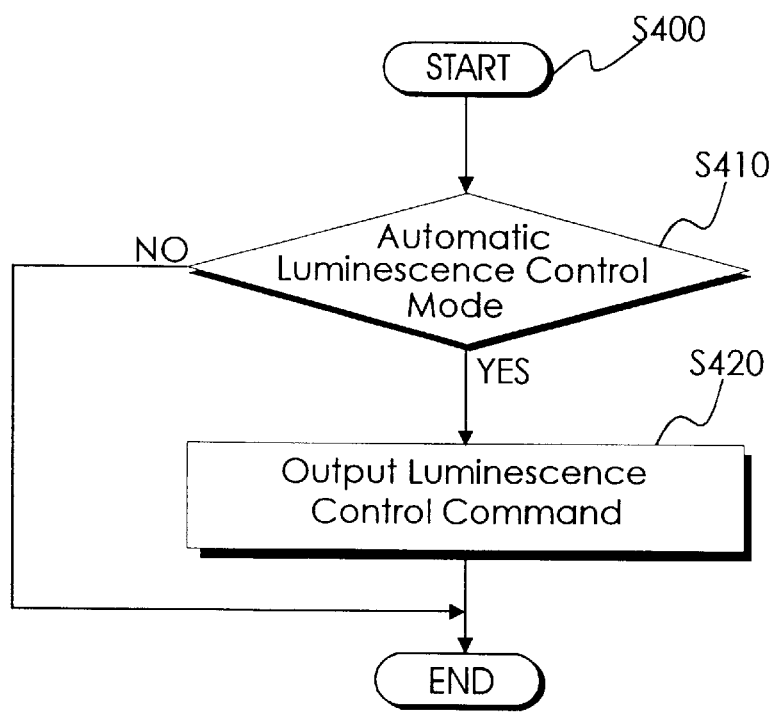
FIG. 4 is a flowchart illustrating the setting of an automatic luminescence control mode in a basic input-output system (BIOS) of an operating system according to the present invention.

Turning now to FIG. 4 which illustrates a process of setting of an automatic luminescence control mode in a basic input-output system (BIOS) of an operating system 10 of the portable computer according to the present invention. When a power source is connected at step S400, the microcontroller 20 checks the system setup mode to determine whether the luminescence controller 36 is enabled. That is, the system BIOS determines from the system setup mode whether the portable computer is in an automatic luminescence control mode at step S410.

In the case where the setup mode indicates that the operating system 10 is in an automatic LCD backlight luminescence control mode at step S410, the operating system 10 outputs a luminescence control command to the microcontroller 20 to control the LCD backlight luminescence of a LCD display 50 at step S420. Upon reception of this luminescence control command from the operating system 10, the microcontroller 20 determines if the automatic luminescence controller 36 is enabled. If it is, the routine to control the luminescence of the backlight of a LCD display 50 is executed as illustrated in FIG. 5.

Figure 5:
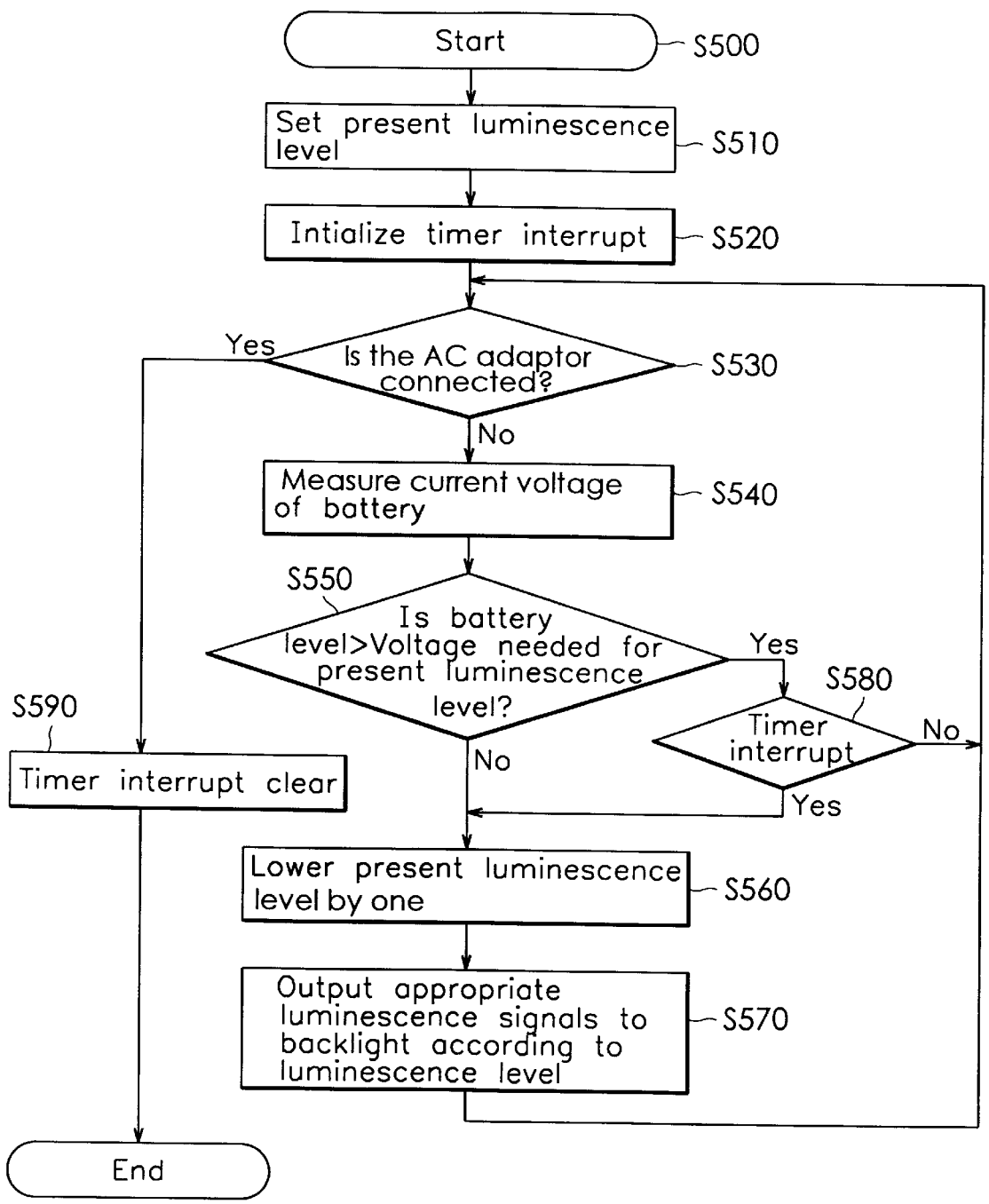
FIG. 5 is a flowchart illustrating the operation of a backlight luminescence control apparatus for a liquid crystal display according to the present invention.

Referring now to FIG. 5 which illustrates the operation of a backlight luminescence control apparatus for a LCD display 50 according to the present invention. First, the microcontroller 20, having received the luminescence control command from the operating system 10 at step S500, sets the luminescence level of the CCFL backlight 40 at step S510, and initializes the timer at step S520.

After the current luminescence level is set and the timer interrupt is initialized at steps S510 and S520, the microcontroller 20 determines whether the AC adaptor 31 is connected to the system at step S530.

Voltage from the battery Vin, after being divided by the resistors R131 and R132, enters the positive terminal of the amplifier OP131 and outputs to the microcontroller 20. The microcontroller 20 determines whether an AC adaptor 31 is connected to the system based on the voltage emitted from the battery state sensor 26, i.e. if the voltage emitted is higher than the battery's highest voltage. If the voltage emitted from the battery state sensor 26 is higher than the battery's highest voltage, microcontroller 20 then determines that an AC adaptor 24 is connected to the portable computer. If, on the other hand, the voltage emitted from the battery state sensor 26 is lower than the battery's highest voltage, the microcontroller 20 then determines that the AC adaptor 31 is not connected to the portable computer.

When the AC adaptor 31 is connected to the portable computer, the microcontroller 20 will not execute the automatic luminescence control routine and will clear the unnecessary timer interrupt at step S590. This is because if a commercially available alternating current (AC) source is provided, there is no need to minimize the power consumption of a LCD display and prolong the service life of a battery. However, when the AC adaptor 31 is not connected to the portable computer and the battery 22 is provided as a power source, the microcontroller 20 will first determine the voltage level of the battery 22 from the voltage emitted from the battery state sensor 26 at step S540.

After ascertaining the voltage level of the battery from the signals of battery state sensor 26, the microcontroller 20 compares this voltage level to the voltage required of the luminescence level established during the initial stages mentioned above at step S550. If the ascertained voltage level is higher than the previously established voltage needed for the current luminescence level, the microcontroller 20 clears the timer interrupt at step S580 and redetermines whether an AC adaptor 31 is connected to the system back in step S530. If, on the other hand, the ascertained voltage level is not greater than the previously established voltage level, ie., lower or equal to the previously established voltage level, the microcontroller 20 lowers the current luminescence level by one and set a new luminescence level at one level lower than the previously established luminescence level at step S560. The microcontroller 20 then generates appropriate luminescence signals to the backlight CCFL 40 corresponding to the newly set luminescence level at step S570. This new luminescence level will in turn tune down the screen luminescence of a LCD display 50.

The following table lists different modes of luminescence levels for a computer screen.

TABLE 1

|  | CH1 | CH2 | CH3 | Screen Luminescence |
|---|---|---|---|---|
| Luminescence Level 0 | 0 | 0 | 0 | Darkest |
| Luminescence Level 1 | 0 | 0 | 1 | |
| Luminescence Level 2 | 0 | 1 | 0 | |
| Luminescence Level 3 | 0 | 1 | 1 | |

TABLE 1-continued

|  | CH1 | CH2 | CH3 | Screen Luminescence |
|---|---|---|---|---|
| Luminescence Level 4 | 1 | 0 | 0 | |
| Luminescence Level 5 | 1 | 0 | 1 | |
| Luminescence Level 6 | 1 | 1 | 0 | |
| Luminescence Level 7 | 1 | 1 | 1 | Brightest |

For example, if the established luminescence level is previously set at 7 and the voltage level of the battery is ascertained at lower than or equal to the voltage needed for luminescence level 7, then the luminescence level is reestablished to 6 and the LCD backlight luminescence is controlled accordingly.

When the luminescence level is set at 7 (the brightest luminescence level for a battery), the microcontroller 20 will emit control signals to activate all three current channels CH1, CH2 and CH3. That is, as shown in table 1, in the case of a luminescence level of 7, the microcontroller (20) sends all three channels CH1, CH2 and CH3 a "high" signal.

If the first channel CH1 receives a "low" signal, the MOS field effect transistor Q112 of the luminescence controller 39 is turned on. If the second channel CH2 receives a "low" signal, the MOS transistor Q113 of the luminescence controller 39 is turned on. When the third channel CH3 receives a "high" signal, the MOS transistor Q114 of the luminescence controller 39 is turned on. If all three MOS transistors Q112, Q113 and Q114 of the luminescence controller 39 is turned on, the backlight CCFL 40 will operate at the brightest level.

The luminescence of the backlight CCFL 40 varies in accordance with the resistance of the variable resistor R61. Hence, if all MOS transistors of the luminescence controller 39 is turned on, the resistance of R61 is at its lowest level, the voltage outputted Va decreases while the current increases allowing the backlight to illuminate at its brightest level.

In order for the backlight to operate at its maximum luminosity, the microcontroller 20 sends a "high" signal to the AC adaptor sensor 28 which causes the MOS transistor Q111 of the luminescence controller 36 to turn on, giving the backlight more power to illuminate even brighter.

When an AC adaptor 31 is not connected to the portable computer, the microcontroller 20 controls the luminescence of the backlight according to available battery power. Here, the state of the control signal from the microcontroller 20 to the AC adaptor sensor 26 is fixed at "high". If the luminescence level of the backlight CCFL 40 is at 7 and the battery voltage is measured at lower than or equal to the voltage required for this level, the luminescence level is lowered from 7 to 6 and the luminescence of the backlight CCFL 40 is controlled accordingly.

After lowering the luminescence level to 6, the microcontroller 20, as shown on table 1, sends a "high" signal to the first channel CH1, a "high" signal to the second channel CH2 and a "low" signal to the third channel CH3.

The signals emitted from the microcontroller 20 to the three channels CH1, CH2 and CH3 causes transistors Q112 and Q113 of the luminescence controller 39 to turn on and transistor Q114 to turn off. The current flowing through then decreases and the backlight CCFL 40 dims down.

If the voltage measured is more than the voltage required for the present luminescence level, the microcontroller 20 determines if the timer interrupt at step S580 for a set amount of time in which a luminescence level has occurred.

The timer interrupt will set off when the maximum amount of time in which a luminescence level has elapsed. If the timer interrupt of the microcontroller 20 has been set off, the microcontroller 20 resets the luminescence level one level lower at step S560.

If the voltage measured is more than the voltage required for the present luminescence level and the timer interrupt has not been set off, the microcontroller 20 determines if the AC adaptor 31 is connected to the system.

Accordingly, by using the above operation, the present invention optimizes the luminescence of a LCD screen in a portable computer according to the power level of their batteries or according to whether or not an AC adaptor 31 is connected to the portable computer. When the battery is being used, the device will automatically select the appropriate luminescence level according to the state of the battery and the user's requirements.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for controlling a backlight of a liquid crystal display of a portable computer, comprising:

a controller for determining whether alternating current is available for the backlight of the liquid crystal display, measuring a voltage level of a battey when the alterating current is not available for the backlight of the liquid crystal display, determining a lumninescence level from the measured voltage level, and generating a luminescence control signal corresponding to the luminescence level determined for controlling the backlight of the liquid crystal display; and a backlight driver for driving the backlight of the liquid crystal display according to the luminescence control signal, said backlight driver comprising:

an adapter sensor for sensing whether an alternating current adaptor is connected to the portable computer to convert an alternating current received from an electrical receptacle into a direct current;

a first converter for producing a switching signal upon reception of the direct current when the alternating current adaptor is connected to the portable computer;

a second converter for transforming the switching signal from the first converter into an alternating current signal and boosting the alternating current signal to supply to the backlight of the liquid crystal display;

a luminescence state sensor for sensing the brightness of the backlight of the liquid crystal display;

an automatic transceiver for transmitting said luminescence control signal corresponding to the luminescence level when the battery is in use; and a luminescence state controller for determining the backlight luminescence of the liquid crystal display according to signals from said adaptor sensor, said automatic transceiver and said luminescence state sensor; and a luminescence controller for controlling the backlight luminescence of the liquid crystal display according to said luminescence control signal.

2. The circuit of claim 1, further comprised of said luminescence state controller controlling the backlight luminescence of the liquid crystal display using three current channels controlled by said controller.

3. The circuit of claim 1, further comprised of said controller establishing the luminescence level and initializing a timer upon reception of said luminescence signal, measuring the voltage level of the battery, comparing the measured voltage level to the voltage level corresponding to the established luminescence level, resetting the luminescence level lower than the established luminescence level, and generating the luminescence control signal corresponding to the reset luminescence level.

4. The circuit of claim 3, further comprised of said controller determining whether the timer interrupt has been set off when the voltage level of the battery is higher than the voltage level required for the established luminescence level, lowering the luminescence level by one level when a maximum time for maintaining a luminescence level has elapsed and the timer interrupt has been set off, producing the luminescence control signal corresponding to the lowered luminescence level, and checking whether the alternating current adaptor is connected to the portable computer when the timer interrupt has not been set off.

5. The circuit of claim 1, further comprising an operating system for determining whether the portable computer is in an automatic luminescence control mode, and when the portable computer is in said automatic luminescence control mode, outputting luminescence control commands to said controller to control the backlight luminescence of the liquid crystal display.

6. A method for driving a backlight of a liquid crystal display used in a portable computer system, comprising the steps of:

initializing a timer to set off in response to passage of time and establishing a luminescence level of the backlight of the liquid crystal display provided by a lamp when the portable computer system has received an automatic luminescence control command;

determining whether an alternating current adaptor transforming alternating current received from an electrical receptacle into direct current is connected to the portable computer system to provide electrical energy to illuminate the backlight of the liquid crystal display in consideration of a feedback of the luminescence level established for the backlight of the liquid crystal display;

sensing a voltage level of a battery providing said electrical energy, when the alternating current adaptor is not connected to the portable computer system;

comparing the sensed voltage level of the battery with a voltage required to maintain the established luminescence level;

adjusting the established luminescence level of the backlight of the liquid crystal display by a unit level, when the voltage level of the battery is different from said voltage required to maintain the established luminescence level; and adjusting the backlight of the liquid crystal display by producing a luminescence control signal corresponding to the adjusted luminescence level of the backlight of the liquid crystal display in consideration of whether the alternating current adaptor is determined to be connected said voltage level, and said established luminescence level.

7. The method of claim 6, further comprising the steps of:

determining whether the timer interrupt has been set off, when the voltage level of the battery is higher than the voltage required to maintain the established luminescence level;

lowering the established luminescence level by a unit level, when the timer interrupt has been set off;

producing said luminescence control signal corresponding to the lowered luminescence level to the backlight of the liquid crystal display; and checking whether the alternating current adaptor is connected to the portable computer system when the timer interrupt has not been set off.

8. The method of claim 6, wherein, when the portable computer system has received a luminescence control command, a basis input/output system routine is executed to determine whether an automatic luminescence control mode has been established in said portable computer system, and when said automatic luminescence control mode has been established in said portable computer system, the luminescence control command is generated to control the backlight luminescence of the liquid crystal display.

9. A backlight luminescence control circuit for controlling a backlight of a liquid crystal display of a portable system, said backlight lnescence control circuit comprising:

an adapter sensor for sensing whether an alternating current adapter is connected to said portable system to convert alternating current into direct current;

a set of battery terminals providing the direct current to said portable system, when said alternating current adapter is not connected to said portable system;

a direct current/direct current converter receiving said direct current and generating a switched signal;

a direct current/alterating current converter driving a backlight source by generating an increased electric potential after converting said switched signal output from said direct current/direct current converter, said backlight source providing backlight for said liquid crystal display;

an on/off controller driving of said direct current/direct current converter to interrupt operation of said backlight source;

a luminescence controller controlling a degree of brightness of the backlight of said liquid crystal display provided by said backlight source;

a feedback unit feeding an output signal from said luminescence controller back to said direct current/direct current converter;

a luminescence state sensor determining said degree of brightness of the backlight of said liquid crystal display based on said output signal from said luminescence controller;

a battery signal sensor generating signals indicating a residual amount of battery power when said battery is being used to provide said direct current; and a lumninescence state controller determining and controlling said degree of brightness of the backlight of said liquid crystal display from signals output from said adapter sensor, said battery signal sensor and said luminescence state sensor.

10. The backlight luminescence control circuit of claim 9, wherein said adapter sensor comprises a Zener diode enabling generation of a constant reference voltage and a comparator for comparing said constant reference voltage with an input voltage.

11. The backlight luminescence control circuit of claim 9, wherein said luminescence state sensor operates on a basis of a voltage level of said output signal from said luminescence controller.

12. The backlight luminescence control circuit of claim 9, wherein said luminescence controller comprises a variable resistor controlling said degree of brightness of the backlight of said liquid crystal display based on a resistance value exhibited by said variable resistor.

13. The backlight luminescence control circuit of claim 9, wherein said degree of brightness of the backlight of said liquid crystal display provided by said backlight source is controlled to comply with a personal preference of an operator of the portable system.

14. A circuit for controlling a backlight of a liquid crystal display of a portable system, said circuit comprising:
  an alternating current adapter receiving alternating current from an electrical receptacle and converting said alternating current into direct current used to produce the backlight of said liquid crystal display;
  a battery providing the direct current used to produce the backlight of said liquid crystal display when said alternating current adapter is not connected to the portable system;
  an adapter sensor determining whether said alternating current adapter is being used to generate said direct current;
  a controller automatically controlling the backlight of said liquid crystal display based on whether said alternating current adapter is connected to the portable system, and a detected level of residual power of said battery, said controller generating luminescence control signals enabling the backlight of said liquid crystal display to be exhibited at a first level when said alternating current adapter is being used to generate said direct current, and alternatively enabling the backlight of said liquid crystal display to be exhibited at one of a plurality of brightness levels having a lower intensity than said first level when said battery is being used to generate said direct current; and
  a backlight driver for driving the backlight of the liquid crystal display according to the luminescence control signals, said backlight driver comprising:
    power converters connected to said alternating current adapter and said battery providing electrical power to the backlight of the liquid crystal display;
    a luminescence state sensor sensing the brightness of the backlight of the liquid crystal display;
    a luminescence state controller controlling the brightness of the backlight of the liquid crystal display according to said luminescence control signals and signals from said adaptor sensor and said luminescence state sensor; and
    a luminescence controller controlling a backlight source of the liquid crystal display to adjust the brightness of the backlight of the liquid crystal display under control of said luminescence state controller.

15. The circuit of claim 14, wherein said plurality of brightness levels correspond to seven different of said brightness levels.

16. The circuit of claim 14, wherein said control means enables said backlight of said liquid crystal display to be exhibited at a darkest level when said residual power of said battery is at a low level.

17. The circuit of claim 15, further comprising a cold cathode fluorescent lamp providing the backlight of said liquid crystal display.

18. The circuit of claim 16, further comprising a cold cathode fluorescent lamp providing the backlight of said liquid crystal display.

19. The circuit of claim 1, further comprising a cold cathode fluorescent lamp providing backlight of said liquid crystal display.

20. The circuit of claim 14, wherein said adapter sensor comprises a Zener diode for providing a constant reference voltage and a comparator comparing said constant reference voltage with an input voltage.

21. The circuit of claim 14, wherein said luminescence controller comprises a variable resistor controlling said degree of brightness of the backlight of said liquid crystal display based on a resistance value exhibited by said variable resistor.

22. The circuit of claim 14, wherein said degree of brightness of the backlight of said liquid crystal display provided by a backlight source is selectively controlled by an operator of the portable system.

23. The circuit of claim 22, further comprising a cold cathode fluorescent lamp providing backlight of said liquid crystal display.

* * * * *